(12) United States Patent
Sultenfuss et al.

(10) Patent No.: US 11,073,885 B2
(45) Date of Patent: *Jul. 27, 2021

(54) BATTERY ARCHITECTURE FOR VARIABLE LOADS AND OUTPUT TOPOLOGIES IN AN INFORMATION HANDLING SYSTEM

(71) Applicant: Dell Products, L.P., Round Rock, TX (US)

(72) Inventors: Andrew Thomas Sultenfuss, Leander, TX (US); Mitch Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 456 days.

This patent is subject to a terminal disclaimer.

(21) Appl. No.: 15/658,545

(22) Filed: Jul. 25, 2017

(65) Prior Publication Data

US 2019/0033946 A1    Jan. 31, 2019

(51) Int. Cl.
| | | |
|---|---|---|
| *G06F 1/32* | (2019.01) | |
| *G06F 1/30* | (2006.01) | |
| *G06F 1/26* | (2006.01) | |
| *G06F 1/3212* | (2019.01) | |
| *G06F 1/3296* | (2019.01) | |

(52) U.S. Cl.
CPC ............ *G06F 1/3212* (2013.01); *G06F 1/263* (2013.01); *G06F 1/305* (2013.01); *G06F 1/3296* (2013.01); *G06F 1/26* (2013.01); *G06F 1/30* (2013.01); *G06F 1/32* (2013.01)

(58) Field of Classification Search
None
See application file for complete search history.

(56) References Cited

U.S. PATENT DOCUMENTS

| | | | |
|---|---|---|---|
| 6,885,155 B2 | 4/2005 | Speirs et al. | |
| 2008/0059816 A1* | 3/2008 | Paniagua | G06F 1/26 713/300 |
| 2011/0093840 A1* | 4/2011 | Pynenburg | H02J 7/0004 717/168 |
| 2012/0153856 A1 | 6/2012 | Liu et al. | |
| 2012/0274280 A1* | 11/2012 | Yip | H02J 7/0014 320/112 |
| 2013/0020951 A1 | 1/2013 | Pollock et al. | |
| 2014/0189241 A1* | 7/2014 | Rajwar | G06F 12/0815 711/122 |
| 2014/0268946 A1* | 9/2014 | Liu | H02M 3/1582 363/60 |
| 2014/0304542 A1* | 10/2014 | Rogers | G06F 1/28 713/340 |
| 2017/0115710 A1* | 4/2017 | Jain | G06F 1/26 |
| 2017/0244245 A1* | 8/2017 | Hajje | H02M 3/07 |
| 2018/0181182 A1* | 6/2018 | Yu | G06F 1/3212 |

(Continued)

*Primary Examiner* — Tanh Q Nguyen
(74) *Attorney, Agent, or Firm* — Fogarty LLP

(57) ABSTRACT

A battery architecture for variable loads and output topologies in an information handling system (IHS) is described. In some embodiments, an IHS may include an embedded controller (EC) and a memory coupled to the EC, the memory having program instructions stored thereon that, upon execution, cause the EC to: determine a characteristic of a battery coupled to the IHS, and select a scalar factor of a buck-boost converter coupled to an output of the battery in response to the characteristic.

8 Claims, 5 Drawing Sheets

(56) References Cited

U.S. PATENT DOCUMENTS

| | | | |
|---|---|---|---|
| 2018/0212436 A1* | 7/2018 | Ouyang | H02J 7/00036 |
| 2018/0232183 A1* | 8/2018 | Rajendiran | G06F 1/3215 |
| 2018/0241925 A1* | 8/2018 | Suzuki | H04N 21/434 |
| 2018/0255225 A1* | 9/2018 | Yu | H04N 9/68 |
| 2019/0033941 A1* | 1/2019 | Sultenfuss | G06F 1/266 |
| 2019/0033946 A1* | 1/2019 | Sultenfuss | G06F 1/3212 |
| 2019/0036367 A1* | 1/2019 | Sultenfuss | H02J 7/025 |

\* cited by examiner

BATTERY ARCHITECTURE FOR VARIABLE LOADS AND OUTPUT TOPOLOGIES IN AN INFORMATION HANDLING SYSTEM

FIELD

The present disclosure generally relates to information handling systems, and, more particularly, to systems and methods for a battery architecture for variable loads and output topologies in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have any number of subsystems, and each subsystem may have different electrical requirements and specifications. For example, a first subsystem (e.g., a host processor) may have a low-voltage topology while a second subsystem (e.g., a high-resolution display) may have a high-voltage topology. Today, designing an information handling system involves selecting either the low-voltage or the high-voltage subsystem for optimization, while the other subsystem suffers attendant power losses.

SUMMARY

Embodiments of systems and methods for a battery architecture for variable loads and output topologies in an information handling system (IHS) are described. In an illustrative, non-limiting embodiment, an IHS may include an embedded controller (EC) and a memory coupled to the EC, the memory having program instructions stored thereon that, upon execution, cause the EC to: determine a characteristic of a battery coupled to the IHS, and select a scalar factor of a buck-boost converter coupled to an output of the battery in response to the characteristic.

To determine the characteristic, the program instructions, upon execution, may cause the EC to identify the battery or a component of the battery. To identify the battery, the program instructions, upon execution, may cause the EC to retrieve a serial number of the battery. Additionally or alternatively, to determine the characteristic of the battery, the program instructions, upon execution, may cause the EC to retrieve a power resource specification of the battery from an Advanced Configuration and Power Interface (ACPI) table. Additionally or alternatively, to determine the characteristic of the battery, the program instructions, upon execution, may cause the EC to perform an electrical characterization of the battery.

In some implementations, the program instructions, upon execution, may cause the EC to: select a first scalar factor in response to a battery management unit (BMU) selecting a first battery output terminal, or select a second scalar factor in response to the BMU selecting a second battery output terminal.

In some cases, the program instructions, upon execution, may cause the EC to select a first scalar factor for a first number of cells arranged in series within the battery, or select a second scalar factor for a second number of cells arranged in series within the battery.

The first scalar factor may be larger than the second scalar factor in response to the first number of cells being smaller than the second number of cells. The number of cells used may change dynamically during operation of the IHS. The program instructions, upon execution, may cause the EC to determine a characteristic of a load within the IHS, and select the scalar factor, at least in part, based upon the characteristic of the load.

In another illustrative, non-limiting embodiment, a method may implement one or more of the aforementioned operations. In yet another illustrative, non-limiting embodiment, a hardware memory storage device may have program instructions stored thereon that, upon execution by an IHS, configure and/or cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
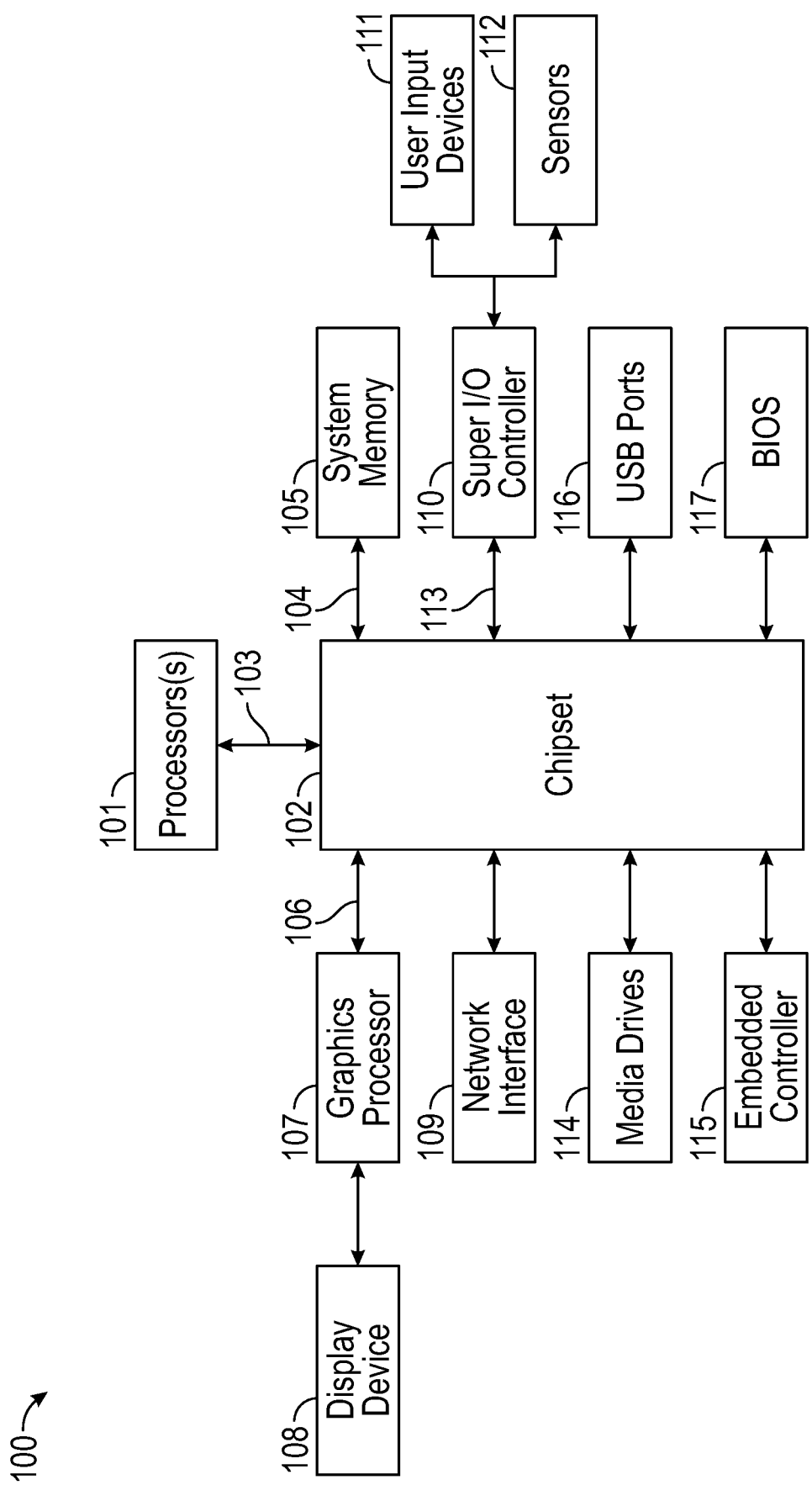
FIG. 1 is a block diagram of a non-limiting example of an information handling system according to some embodiments.

FIG. 1 is a block diagram of a non-limiting example of IHS 100. In various embodiments, systems and methods for a battery architecture for variable loads and output topologies as described herein may be implemented in IHS 100. As shown, IHS 100 may include one or more processors 101. In various embodiments, IHS 100 may be a single-processor system including one processor 101, or a multi-processor system including two or more processors 101. Processor(s) 101 may include any processor capable of executing program instructions, such as any general-purpose or embedded processors implementing any of a variety of Instruction Set Architectures (ISAs).

IHS 100 includes chipset 102 having one or more integrated circuits coupled to processor(s) 101. In certain implementations, chipset 102 utilizes a QPI (QuickPath Interconnect) bus 103 for communicating with processor(s) 101. Chipset 102 provides processor(s) 101 with access to a variety of resources. For instance, chipset 102 provides access to system memory 105 over memory bus 104. System memory 105 may be configured to store program instructions executable by, and/or data accessible to, processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to Graphics Processing Unit (GPU) 107. In certain embodiments, graphics processor 107 may be disposed within one or more video or graphics cards that have been installed as components of the IHS 100. Graphics processor 107 may be coupled to chipset 102 via graphics bus 106 such as provided by an AGP (Accelerated Graphics Port) bus or a PCIe (Peripheral Component Interconnect Express) bus.

In certain embodiments, chipset 102 may provide access to one or more user input devices 111. In those cases, chipset 102 may be coupled to a super I/O controller 110 that provides interfaces for a variety of user input devices 111, in particular lower bandwidth and low data rate devices.

For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. These I/O devices may interface with super I/O controller 110 through wired or wireless connections. In certain embodiments, chipset 102 may be coupled to super I/O controller 110 via Low Pin Count (LPC) bus 113.

Other resources may also be coupled to the processor(s) 101 of IHS 100 through chipset 102. In certain embodiments, chipset 102 may be coupled to network interface 109, such as provided by a Network Interface Controller (NIC) coupled to IHS 100. For example, network interface 109 may be coupled to chipset 102 via PCIe bus 112. According to various embodiments, network interface 109 may also support communication over various wired and/or wireless networks and protocols (e.g., WiGig, Wi-Fi, Bluetooth, etc.).

In certain embodiments, chipset 102 may provide access to one or more Universal Serial Bus (USB) ports 116. Chipset 102 may further provide access to other types of storage devices. For instance, IHS 100 may utilize media drives 114, such as magnetic disk storage drives, optical drives, solid state drives, or removable-media drives.

Upon powering or restarting IHS 100, processor(s) 101 may utilize instructions stored in Basic Input/Output System (BIOS) or Unified Extensible Firmware Interface (UEFI) chip or firmware 117 to initialize and test hardware components coupled to the IHS 100 and to load an Operating System (OS) for use by IHS 100. Generally speaking, BIOS 117 provides an abstraction layer that allows the OS to interface with certain hardware components that utilized by IHS 100. It is through this hardware abstraction layer that software executed by the processor(s) 101 of IHS 100 is able to interface with I/O devices that coupled to IHS 100.

Chipset 102 also provides access to embedded controller (EC) 115. EC 115 is a microcontroller that handles various system tasks, including tasks that the Operating System (OS) executed by processor(s) 101 does not handle. Typically, EC 101 is kept "always-on."

EC 115 may communicate with chipset 102, GPU 107, and/or processor(s) 101, using any suitable form of communication, including the Advanced Configuration and Power Interface (ACPI), System Management Bus (SMBus), or shared memory. In various implementations, EC 115 may have its own RAM (independent of system memory 105) and its own flash ROM, on which firmware is stored. The EC's firmware includes program instructions that, upon execution by EC 115, cause EC 115 to perform a number of operations for buck-boost conversion in IHS 100, as described in more detail below.

In various embodiments, IHS 100 may include various components in addition to those that are shown. For example, IHS 100 may include a power system with one or more power buses or voltage rails configured to provide electrical power to one or more of components 101-117. Each bus or rail may be coupled to a respective subsystem or power plane, and each subsystem may encompass a subset of one or more of components 101-117.

For example, a first subsystem may include a low-voltage load, such as processor(s) 101, and a second subsystem may include a high-voltage load, such as display 108 (e.g., a high-definition (HD) monitor or high-dynamic range (HDR) liquid crystal display (LCD) with a backlight). In this case, the voltage received by the first subsystem may range from approximately 1 to 5 V, while the second subsystem may require 20 to 200 V or more.

Traditional IHS design requires selecting either the low-voltage or the high-voltage subsystem for power delivery optimization. In contrast, the various systems and methods described herein may satisfy dissimilar power needs from various IHS subsystems using the same range multiplier buck-boost topology for varying load points. As such, these systems and methods may provide a "right size" $V_{in}$ architecture that yields system-wide optimized power, as $V_{in}$ (e.g., the voltage provided to a voltage regulator within a subsystem) is specifically mated for each subsystem or component.

In some cases, a power system as described herein may create a $V_{in}$ range that is near the target value or power specifications for a given subsystem(s). As such, the power system may reduce battery conversion loss to 2% per optimized voltage range. These ranges are flat within the multiplier/divisor, and only reflect battery/cell voltage decline range effects (6-8 V=12-16 V, as an example), providing a battery topology much improved over direct drive.

In some embodiments, IHS 100 may not include all of the components shown in FIG. 1. Moreover, some components that are represented as separate components in FIG. 1 may be integrated with other components. For example, in various implementations, all or a portion of the functionality provided by the illustrated components may instead be provided by components integrated into the one or more processor(s) 101 as a system-on-a-chip (SOC) or the like.

Figure 2:
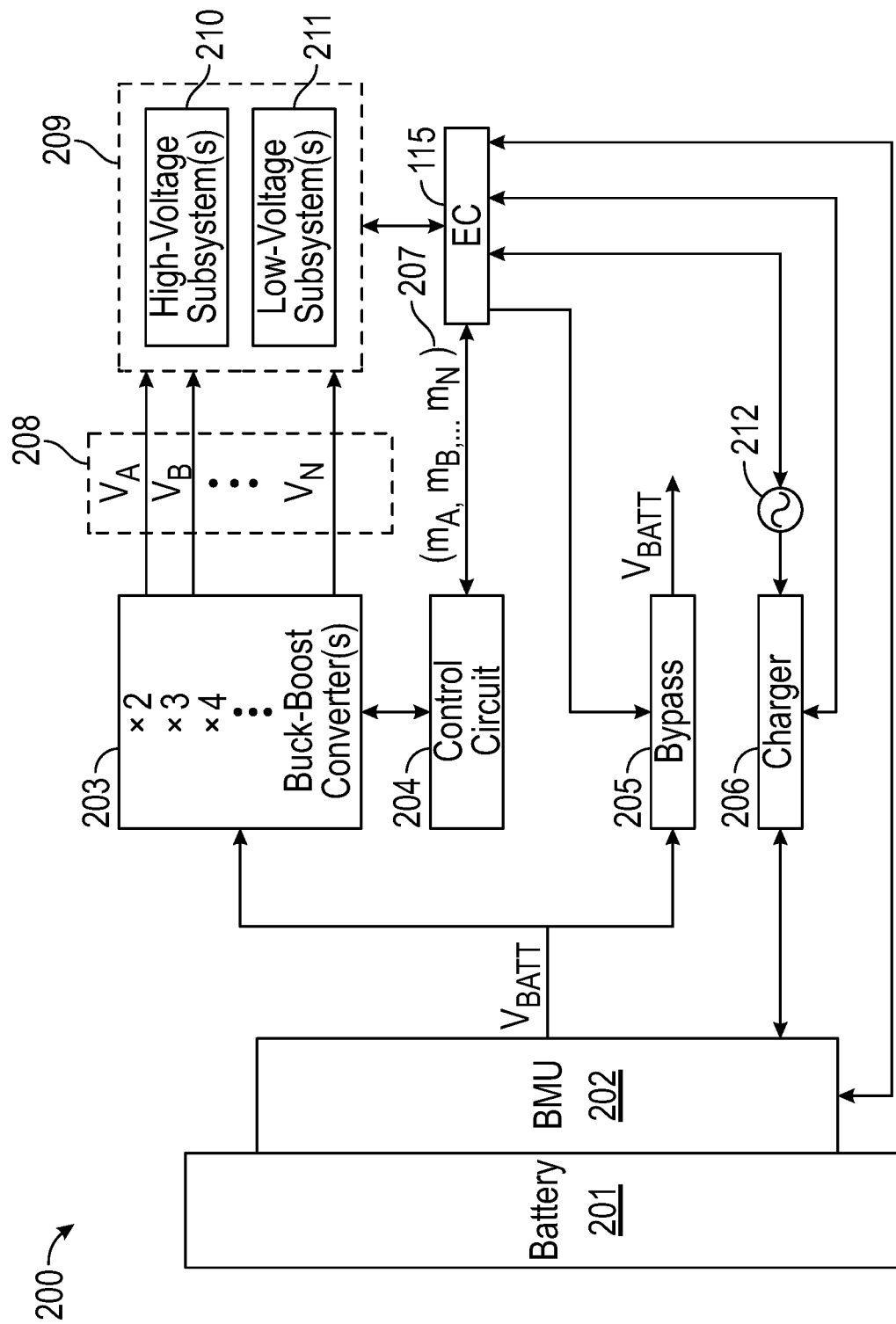
FIG. 2 is a block diagram of a non-limiting example of a power system for buck-boost conversion in an information handling system according to some embodiments.

FIG. 2 is a block diagram of a non-limiting example of power system 200 for buck-boost conversion in IHS 100. As shown, EC 115 is coupled to battery management unit (BMU) 202 of battery 201, charger or DC source 206, bypass circuit 205, AC source 212, control circuit 204 of buck-boost converter 203, and/or other components 209 of IHS 100, including high-voltage subsystem(s) 210 and low-voltage subsystem(s) 211. In various embodiments, EC 115 may be coupled to one or more of the aforementioned elements via chipset 102.

Battery 201 may include one or more cells or cell assemblies. A "cell" is an electrochemical unit that contains electrode(s), separator(s), and/or electrolyte(s). In its simplest form, battery 201 may have a single cell. In many cases, however, battery 201 may multiple cells coupled to each other in series and/or parallel configuration. For instance, battery 201 may have four 3.6 V Lithium-Ion (Li-Ion) or Lithium-Ion Polymer (Li-Polymer) cells coupled in series to achieve a nominal voltage 14.4 V, and two additional batteries coupled in parallel to boost the capacity from 2,400 mAh to 4,800 mAh (incidentally, this particular configuration is referred to as "4s2p," meaning there are four cells in series and two in parallel).

BMU 202 may implement any suitable battery or power supply management system, and it may include a controller, memory, and/or program instructions stored in the memory. The output rail of BMU 202 provides $V_{BATT}$. In operation, BMU 202 may execute its instructions to perform operations such as load balancing, under-voltage monitoring, over-voltage monitoring, safety monitoring, over-temperature monitoring, etc. BMU 202 may also detect whether battery 201 is in charge or discharge mode.

Buck-boost converter 203 may be a DC-to-DC converter that has an output voltage magnitude that is either greater than (boost) or less than (buck) the input voltage. In various implementations, converter 203 may include a switched-mode power supply (SMPS) containing at least two semiconductors (e.g., a diode and a transistor), and at least one energy storage element—a capacitor and/or an inductor. In some cases, converter 203 may include a number of energy storage elements in series, such that nodes between those elements may be used as output terminals. These terminals may be selectively tapped, using switches or the like, to yield a corresponding output voltage that is an integer multiple (or a fraction) of the input voltage.

In some cases, buck-boost converter 203 may have two or more stages. Additionally or alternatively, buck-boost converter 203 may be configured to provide two or more independent voltage conversion rails or channels 208, each feeding a different power bus with a different voltage 208 ($V_A$, $V_B$, $V_N$ . . . ). For example, a multi-channel buck-boost converter and/or an array of buck-boost converters may be used.

Control circuit 204 includes one or more logic circuits configured to receive a scalar value 207 (e.g., m) from EC 115, and to control one or more switches of buck-boost converter 203 in order to yield an output voltage 208 equal to $V_{BATT} \times M$. When a multi-channel buck-boost converter 203 is used, each of scalar values 207 ($m_A$, $m_B$, $m_C$, . . . ) may be applied to a corresponding rail to yield one of output voltages 208 ($V_A$, $V_B$, $V_N$, . . . ), each voltage 208 being a different multiple (or fraction) of $V_{BATT}$. Voltage rail(s) 208 may then be coupled to system 209 and/or to one or more subsystems 210 and 211.

Bypass circuit 205 may include circuitry to bypass buck-boost converter 203 and provide $V_{BATT}$ to any given load. Additionally or alternatively, the value of m applied by buck-boost converter 203 may be selected as "0" or "1", such that output voltage 208 has the same value as $V_{BATT}$.

Charger or DC source 206 may be a power supply unit (PSU), a wall charger, an induction charger, etc. AC source 212 may be any suitable alternating current power source (e.g., provided via an electrical outlet or socket).

System 209 may be IHS 100. High-voltage subsystem 210 may include one or more IHS components 101-117 that operate with a high voltage level (e.g., higher than $V_{BATT}$) and/or at a high-power plane. In some cases, high-voltage subsystem 210 may require a voltage rail of up to 200 V (e.g., a backlit HDR display 108). Conversely, low-voltage subsystem 210 may include one or more IHS components that operate with a low voltage level (e.g., lower than $V_{BATT}$) and/or at a low-power plane. In some cases, low-voltage subsystem 211 may require a voltage rail of down to 1 V (e.g., a processor 101). Generally, each of high-voltage subsystem 210 and low-voltage subsystem 211 may receive a respective unregulated voltage 208, and therefore may include its own voltage regulator.

In operation, system 200 may perform automatic, autonomous, programmatic, on-demand, real-time, and/or dynamic buck-boost conversion in IHS 100. For example, EC 115 may determine a characteristic of high-voltage subsystem 210 and/or low-voltage subsystem 211, and it may control buck-boost converter 203 to modify a voltage (e.g., $V_{BATT}$) provided to subsystem(s) 210 and/or 211 by a power source (e.g., battery 201) based, at least in part, upon the identified characteristic.

For example, EC 115 may identify high-voltage subsystem 210, low-voltage subsystem 211, and/or battery 201 by retrieving a power resource specification of that subsystem from an Advanced Configuration and Power Interface (ACPI) table. Additionally or alternatively, EC 115 may perform an electrical characterization of high-voltage subsystem 210, low-voltage subsystem 211, battery 201, and/or component(s) thereof.

Based upon a comparison between $V_{BATT}$ and the voltage needed by the identified subsystem, EC 115 may calculate suitable m values. For example, if $V_{BATT}$ is 6 V and the power requirement of high-voltage subsystem is 24 V, m would be equal to 4. When the power requirement is a range (e.g., between 18 and 22 V), m may be selected to provide an output voltage value 208 falling within that range (e.g., 20 V). Moreover, when the power requirement of the subsystem is not an integer multiple of $V_{BATT}$ (e.g., $V_{BATT}$ is 6 V and the subsystem requires a 15 V rail), m may be selected to be below or above that value (e.g., m=2 or 3, respectively), depending upon that subsystem's voltage regulator characteristics (e.g., whether better performance with either under or over-voltage at its input terminals).

In some cases, EC 115 may be coupled to processor(s) 101 and/or GPU 107, for example, via chipset 102. Additionally or alternatively, EC 115 may be coupled directly to subsystem(s) 210 and/or 211.

As such, EC 115 may dynamically change the value of m. For example, EC 115 receive a notification that subsystem(s) 210 and/or 211 have changed from a first operating state to a second operating state, and may control buck-boost converter 203 to adjust voltage 208 in response to the change, during operation of IHS 100, typically without the need for a reboot.

For instance, low-voltage subsystem 211 may include processor 101, the first operating state may be a turbo state, and the second operating state may be a non-turbo state. In this case, processor 101 may require a higher voltage when operating in the first operating state than in the second operating state, and therefore the value of m selected during the first operating state may be larger than the value of m selected during the second operating state.

Additionally or alternatively, high-voltage subsystem 210 may include a backlit display 108, the first operating state may be a high-dynamic range (HDR) state, and the second operating state may be a non-HDR state. In this case, display 108 may also require a higher voltage when operating in the first operating state than in the second operating state, and therefore the value of m selected during the first operating state may be larger than the value of m selected during the second operating state.

Additionally or alternatively, EC 115 may receive a notification that the power source (e.g., battery 201) has changed from a first state to a second state, and it may control buck-boost converter 203 to modify output voltage 208 by selecting a value of m based upon the change. For example, in first state the power source may provide an amount of electrical power below a threshold (e.g., battery 201 is discharged), and, in the second state, the power source may provide an amount of electrical power above the threshold (e.g., battery 201 is charged). Therefore, the value of m selected during the first operating state may be larger than the value of m selected during the second operating state.

Figure 3:
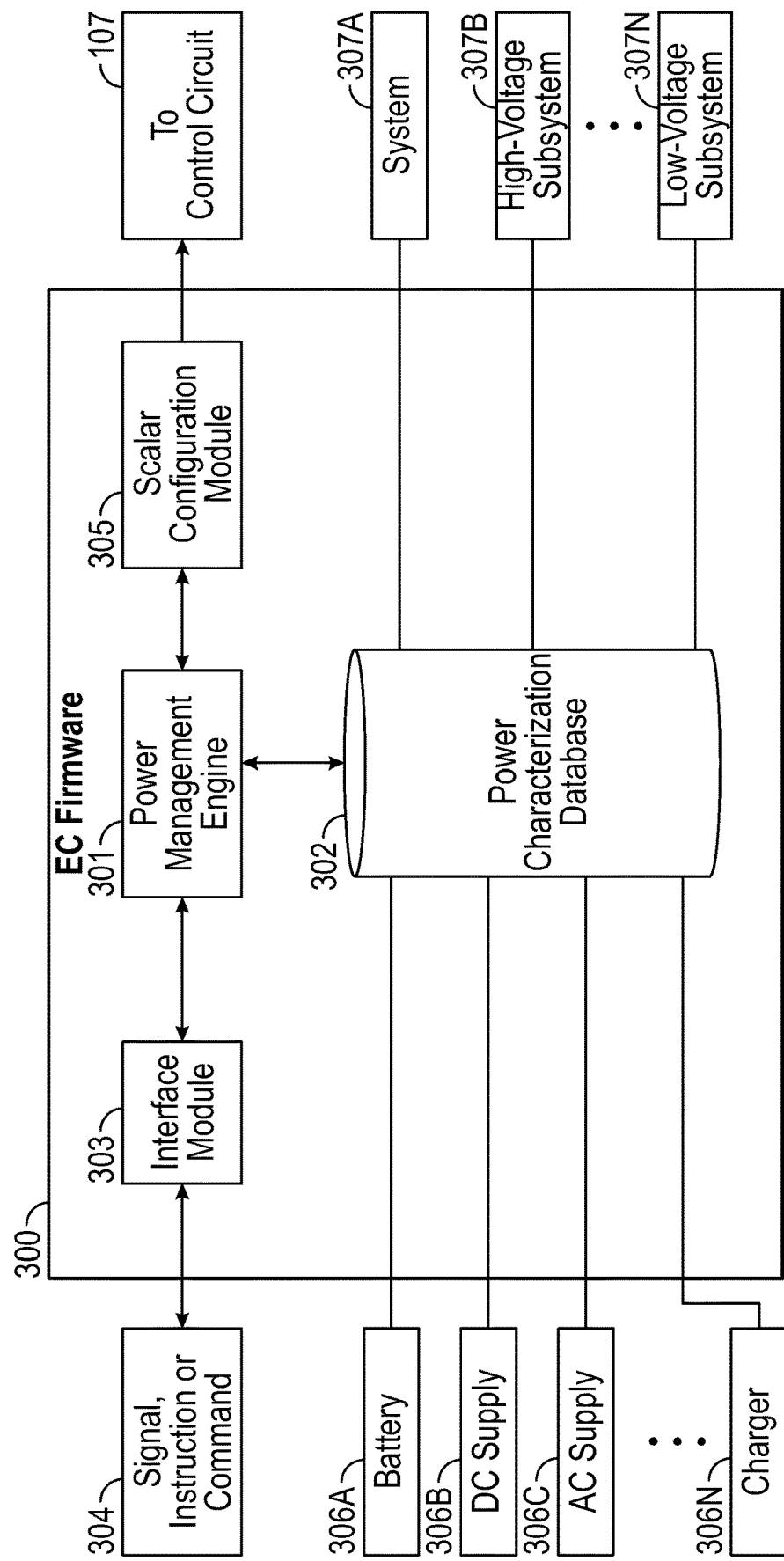
FIG. 3 is a block diagram of a non-limiting example of embedded controller firmware according to some embodiments.

FIG. 3 is a block diagram of a non-limiting example of EC firmware components 300. In some embodiments, program instructions implementing firmware 300 may be executed by EC 115 to perform one or more operations for buck-boost conversion in IHS 100.

As shown, EC firmware 300 includes power management engine 301 coupled to interface module 303 and to scalar configuration module 305. Interface module 303 may be configured to transmit and/or receive any suitable signal, instruction, or command 304 to/from any of a number of components of IHS 100. For example, interface module 303 may be configured to communicate with high-voltage subsystem 210 and/or low-voltage subsystem 211, processor(s) 101, GPU 107, USB ports 116, media drives 114, and/or BIOS 117, for example, using ACPI or SMBus protocols or techniques.

In some cases power management engine 301 may query subsystem(s) 210 and/or 211 for identification information (e.g., SKU, EDID, UID, model number, version, etc.) using interface module 303. Additionally or alternatively, subsystem(s) 210 and/or 211 may provide identification information to power management engine 301 using interface module 303. Additionally or alternatively, power management engine 301 may perform electrical characterization operations upon subsystem(s) 210 and/or 211 via interface module 303.

Power management engine 301 may be configured to receive or generate subsystem identification and/or power characterization information, and to determine a suitable voltage value to be provided to each respective subsystem, for example, from ACPI table(s).

In some cases, a Differentiated Definition Block may describe each device, component, or subsystem handled by ACPI, including a description of what power resources (power planes and/or clock sources) a subsystem needs in each power and/or operating state that the subsystem supports (e.g., a given IHS subsystem may require a high power bus and a clock in the a higher-power state, but only a low-power bus and no clock in a lower-power state). The ACPI table(s) may also list the power planes and clock sources themselves, and control methods for turning them on and off.

The result of the identification and/or characterization operation(s) performed by power management engine 301 may be stored and/or retrieved from/to database 302. As such, database 302 may include any of the aforementioned information for power sources 306A-N (e.g., battery, DC supply, AC supply, charger, etc.), as well as electrical loads 307 (e.g., entire IHS 209, high-voltage subsystem 210, low-voltage subsystem 211, etc.). In some cases, more than one of the same type of source may be present—e.g., two or more batteries.

For each subsystem in its present operating state, power management engine 301 may compare output voltage(s) natively provided by battery 201 against the voltage requirements for that subsystem in that state and at that time. The value of m may be directly or inversely proportional to a ratio between these two voltages or voltage ranges.

Scalar configuration module 305 is configured to switch storage elements on or off within buck-boost converter 203 via control circuit 207 to implement the calculated value of m 207 and to apply that value to $V_{BATT}$, thereby providing output voltage 208.

Figure 4:
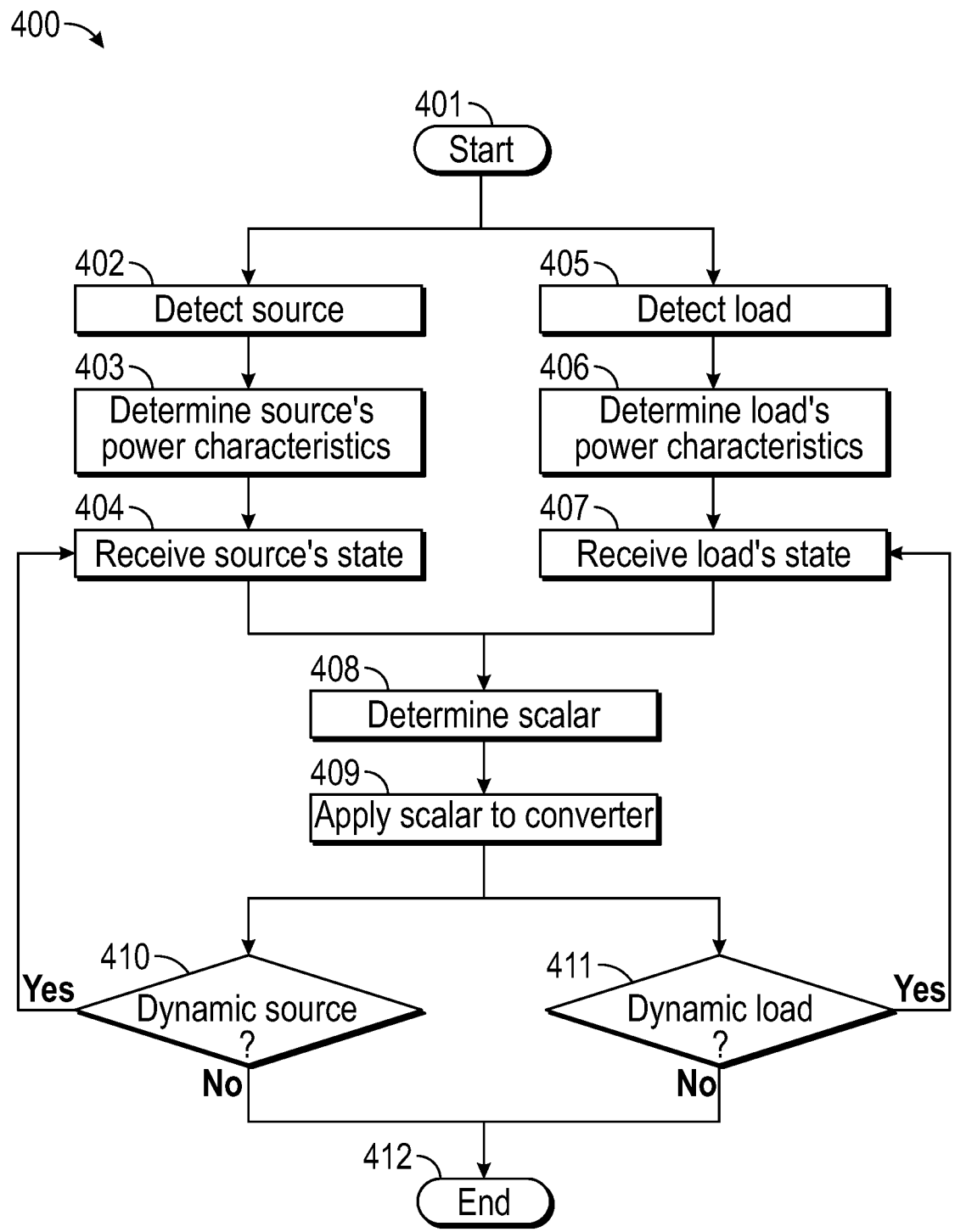
FIG. 4 is a flowchart of a non-limiting example of a method for buck-boost conversion in an information handling system according to some embodiments.

FIG. 4 is a flowchart of a non-limiting example of method 400 for buck-boost conversion. In some embodiments, method 400 starts at block 401 and it may be implemented at least in part through the execution of one or more firmware component(s) 300 by EC 115. At blocks 402 and 405, method 400 may detect a power source 306 and/or load 307 coupled to IHS 100, respectively, for example, based upon information retrieved from an ACPI table or the like. Additionally or alternatively, power sources 30A-N and subsystems 307A-N may be identified.

Particularly, each of power sources 306A-N and subsystems 307A-N may be coupled to a respective power connector, and IHS 100 may detect those connections. In an embodiment, each of power sources 306A-N and subsystems 307A-N may be connected to IHS 100 via a single connector. In another embodiment, however, any of power sources 306A-N or subsystems 307A-N may be connected to IHS 100 using various connectors at the same time.

To identify one or more of power sources 306A-N or subsystems 307A-N at blocks 402 and 405, analog circuitry may be employed to detect and enable each entity. One or more of power sources 306A-N may be "smart" entities that, along with power, provides the source's identity and/or characteristics about the power such as nominal and minimum voltage, maximum current, and/or a variety of other power characteristics. In another example, one or more of the power sources may be "dumb" or legacy source that simply provides power, and method 400 may analyze that power to determine one or more power characteristics such as nominal and minimum voltage, maximum current, etc. Additionally or alternatively, power characteristics may be stored in database 302.

In some cases, at blocks 402 and 405, method 400 may also determine that the power source(s), subsystems 307A-N, and/or IHS 100 are compatible with one another and/or properly configured to use power system 200. The remainder of method 400 assumes that components have successfully negotiated a connection and/or performed a handshake operation. If the handshake fails and/or if a given component rejects another, method 400 may end at block 412.

Additionally or alternatively, if one of sources 306A-N is identified and the load(s) are not, operations 405-407 may be skipped. Additionally or alternatively, if one of loads 307A-N is identified and the source(s) are not, operations 402-404 may be skipped.

At blocks 403 and 406, method 400 may detect power characteristics of power source 306A-N and/or loads 307A-N, respectively. For example, blocks 403 and 406 may retrieve power information from an ACPI table or the like.

Alternatively, a plurality of charging characteristics may be determined for battery 201. In some embodiments, block 403 may determine the battery charge level and select a plurality of charging rates for battery 201 that include a minimum charge rate, a maximum charge rate, and/or a plurality of intermediate charge rates between the minimum charge rate and the maximum charge rate. The charging process may include many factors that can impact battery life, and block 403 is operable to consider power source capability, battery charge level, and operation power requirements of system components in determining the charge rate.

Block 403 may retrieve from battery 201, or from database 203, a plurality of battery characteristics that include battery type (e.g., lithium ion, lithium polymer, etc.), battery capacity, and/or a variety of battery characteristics (e.g., number of cells, output rails, etc.). For example, a charge rate desirable for a given battery may require more power than can be provided by a particular power source under desired operation levels of other system components, while a more capable power source may support the optimum charge rate, and the system allows for the characterizations of those variable in determining the charge rate to be supplied to a battery.

In an embodiment, the power characteristics may be for power provided from a single power input. In another embodiment, the power characteristics may be for a total power provided from a plurality of power inputs (e.g., the power characteristics may be determined for a total power provided from a plurality of different power inputs that each provides a discrete power source for IHS 100). In another embodiment, the power characteristics may be power characteristics for power provided from each of a plurality of power inputs (e.g., power characteristics may be determined for each of a plurality of discrete power sources provided from respective power inputs connected to the IHS 100) in order, for example, to select the highest power and/or the optimal power source for IHS 100.

At block 406, a plurality of operation characteristics may be determined for subsystems 210 and/or 211 in IHS 100. Block 406 may determine a plurality of operating levels for subsystems 210 and/or 211 that include a minimum operation level, and maximum operation level, and/or a plurality of intermediate operation levels between the minimum operation level and the maximum operation level. In an embodiment, the determination of operating characteristics for certain processors may include capping their operating power states (P-states) or disabling a "turbo-mode."

Additionally or alternatively, block 406 may retrieve from subsystems 210 and/or 211, or from database 203, a plurality of component characteristics that include, for example, power consumption for processor operating states, memory technology type (e.g., low power, standard, etc.), storage technology type (e.g., solid state, hard disk drive (HDD), etc.), and/or a variety of other component characteristics. Block 406 may then use the component characteristics with the power input characteristics to determine the operation characteristics.

In an embodiment, the operation characteristics may be determined for system 209 operating together. In another embodiment, operation characteristics may be determined for each of subsystems 210 and/or 211 individually.

At blocks 404 and 407, method 400 may identify the source's state and/or the load's state (e.g., number of cells, charge level, turbo, HDR, etc.). In some cases, the source and/or load may operate in a single state, and therefore blocks 404 and/or 405 may be performed only once, or may be skipped altogether.

At block 408, method 400 calculates scalar value(s) 207 to be applied to $V_{BATT}$ by buck-boost converter 203 via control circuit 204. Then, at block 409, method 400 applies scalar value(s) 207 to $V_{BATT}$ to generate output voltage(s) 208.

At block 410, if source 306 is subject to dynamically changing states during operation, control returns to block 404 and the source's current or present state is again processed to calculate scalar value(s) 207 at block 408. Similarly, at block 411, if load 307 is subject to dynamically changing states, control returns to block 407 and the load's current or present state is used to calculate scalar value(s) 207 at block 408. Otherwise, method 400 ends at block 412.

Accordingly, systems and methods described herein may be implemented, for example, to provide a battery architecture for variable loads and output topologies in IHS 100. Batteries that have a single output have issues with modern mobile system LCD and CPU needs, because the former has a high-voltage operating requirement whereas the latter has a low-voltage operating requirement. Conventionally, trade-offs are made to optimize one of the two different loads or topologies at a time. Using systems and methods described herein, however, a multi-cell battery pack may allow simultaneous 2s and 4s output mode, for example, as well as switching the low-side with the high-side for capacity balancing.

In some cases, battery 201 may include Li-ion cells that are connected either in series or in parallel. Battery 201 may supply a range of voltages and currents depending upon the requirements of IHS 100. In various embodiments, BMU 202 may at least partially control the operation of battery 201. For example, BMU 202 may control the charging and discharging of battery 201.

Figure 5:
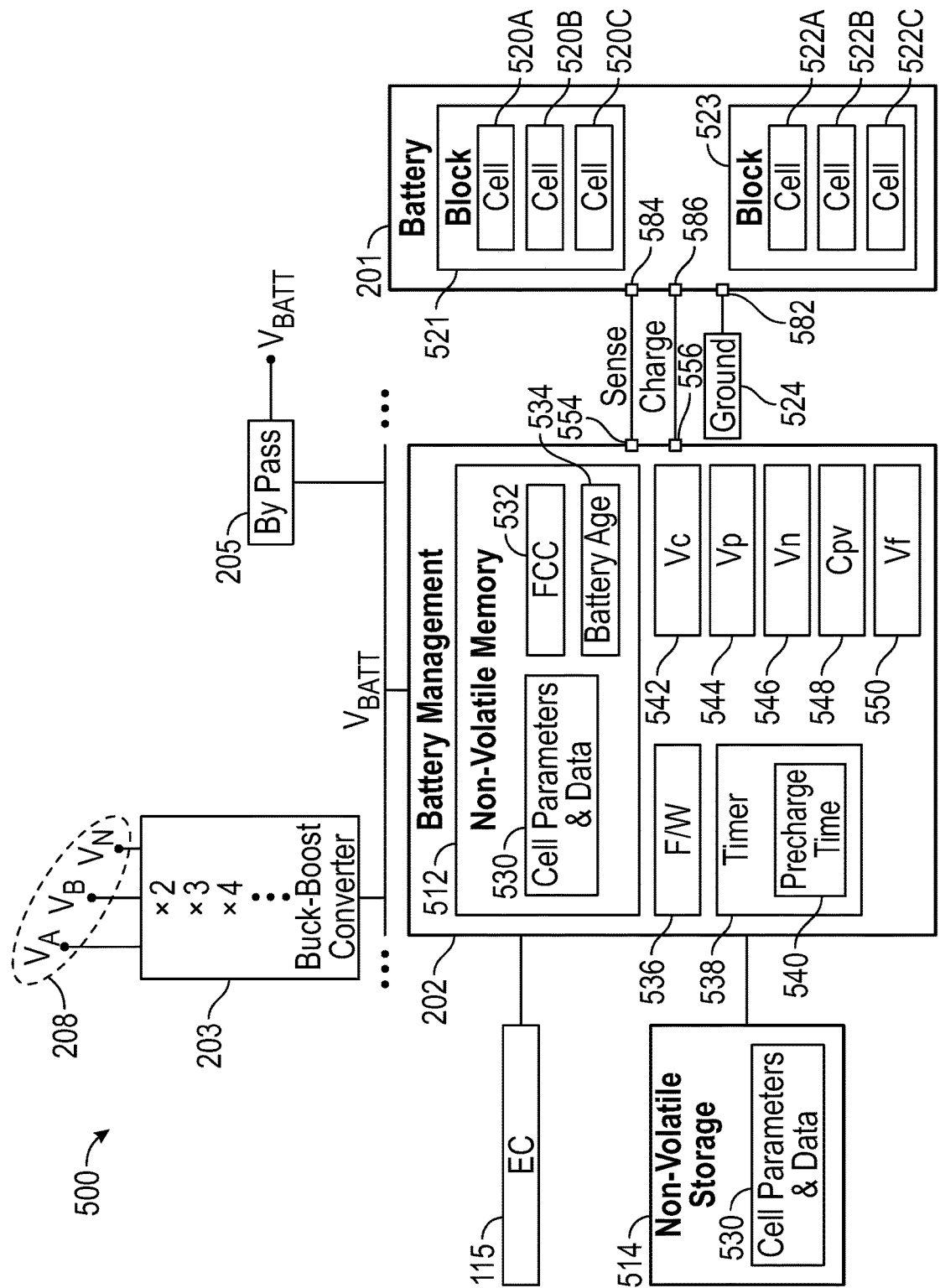
FIG. 5 is a diagram of a non-limiting example of a battery architecture for variable loads and output topologies according to some embodiments.

FIG. 5 is a diagram of a non-limiting example of battery architecture 500 for variable loads and output topologies according to some embodiments. Architecture 500 includes BMU 202, battery 201, and non-volatile storage 514. BMU 140 is coupled to EC 115 and/or to other components of IHS 100.

Battery 201 comprises one or more battery cells 520A-C and 522A-C. Cells 520A-C and 552A-C may be connected in series or in parallel, or in a combination of series and parallel connections. In an embodiment, cells 520A-C may be connected in series or in parallel to form block 521 and cells 522A-C may be connected in series or in parallel to form block 523. Blocks 521 and 523 may be connected in series or in parallel to form battery pack 150. When individual cells 520A-C and 522A-C are connected in parallel, one or more operations described herein may be performed at the block level. In other words, cells that are connected in parallel may be monitored and controlled as a single block.

In some embodiments, cells 520A-C and 522A-C may include Li-ion cells. The Li-ion cells may be be made from a variety of anode, cathode and electrolyte materials, each of which have a specific composition. Because the Li-ion cells can have a variety of cathode, anode and electrolyte materials, the energy density and voltage can vary according to the electrochemistry of the cell.

Cell parameters and data 530 may include information that is specific to the particular battery cells used in battery 201. In some implementations, cell parameters and data 530 may include a lookup table that maps each specific battery cell 520A-C and 522A-C to a correction factor that may be dependent upon the specific electrochemical composition and performance of that battery cell. For example, a chemistry correction factor may be dependent upon the specific material and chemical composition of the cell.

In some cases, cells 520A-C may be B3 type cells that are formed with lithium cobalt oxide cathodes and an ethylene carbonate electrolyte that contains complexes of lithium ions. Additionally or alternatively, cells 522A-C may be G8 type cells that are formed with lithium iron phosphate cathodes and a diethyl carbonate electrolyte that contains complexes of lithium ions. Cell parameters and data 530 can also include other parameters, such as a total number of over discharge events and a total number of a discharge cycles for battery 201.

Each of cells 520A-C and 522A-C has a real-time cell voltage (Vc). Battery 201 has terminals 582, 584 and, 586. Terminal 582 is connected to ground 524. Terminal 584 is a sense terminal used to sense the real-time cell voltages, and terminal 586 is a charge terminal used to recharge the cells.

FCC 532 represents the initial or last measured full discharge capacity of the battery 201. FCC 532 is used as the battery full-charge reference for relative capacity indication. The value of FCC 532 is tracked by BMU 202 over time, it is updated after the battery undergoes a qualified discharge from a nearly full to a low battery level, and it is then stored to memory 512. The value of FCC 532 may be read from memory 512. Battery age 534 is the total cumulative time that the battery 201 has been in use. Battery age 534 is tracked by BMU 202 and stored in memory 512.

BMU 202 further includes firmware (F/W) 536 and timer 538. Firmware (F/W) 536 executes within BMU 202 to enable various operations. Timer 538 may be used to track a charge time, a pre-charge time, or the like 540. BMU 202 may also tracks the real-time cell voltage (Vc) 542 for each of cells 520A-C and 522A-C.

BMU 202 may calculate a capacity based pre-charge value (Cpv) 548 for each of cells 520A-C and 522A-C. BMU 202 may also include a pre-charge voltage (Vp) 544. In some embodiment, pre-charge voltage (Vp) 544 may be pre-determined and stored in cell parameters and data 530. In other embodiments, pre-charge voltage (Vp) 544 may be calculated by BMU 202 based on cell parameters and data 530. BMU 202 may also include a normal cell operating voltage (Vn) 546 for each of cells 520A-C and 522A-C.

In various embodiments, memory 512 may store cell parameters and data 530, full charge capacity (FCC) 532, battery age 534, etc. In other implementations, cell parameters and data 530 may be stored in a non-volatile storage device 514, such as flash memory or a solid state drive.

BMU 202 is in communication with non-volatile storage device 514 and it may retrieve cell parameters and data 530 from non-volatile storage device 514.

BMU 202 has terminal 554 coupled to sense terminal 584 and terminal 556 coupled to charge terminal 586. BMU 202 controls the charging of battery 201. BMU 202 includes internal non-volatile memory 512. Memory 512 may be a persistent storage device such as flash memory that retains data without power.

In operation, cell parameters and data 530 may be provided from BMU 202 to EC 115 in order to enable EC 115 to identify battery 201, its components, and/or features. In some implementations, cell parameters and data 530 may be determined upon retrieval of a serial or model number, UID, SKU, etc. from BMU 202. Additionally or alternatively, cell parameters and data 530 may be determined via an electrical characterization procedure, as discussed above.

For sake of illustration, during operation of IHS 100, assume that firmware 536 runs or executes on BMU 202. BMU 202 detects real-time cell voltage Vc 542 for each individual cell, group of cells, or for all of the cells, and passes those cell parameters and data 530 to EC 115. As an example, BMU 202 may notify EC 115 that battery 201 has four cells (4s) and two output terminals: 2s (at 5 V) and 4s (at 10 V).

In response to EC 115 identifying a load that requires a ~5 V rail 208, EC 115 may couple the load to the power bus provided by the 2s output terminal while selecting a value of m equal to 1 (or it may switch the load to receive $V_{BATT}$ from bypass circuit 205). Additionally or alternatively, EC 115 may cause the load to receive a power bus from the 4s output terminal, and it may select a value of m 207 equal to 0.5 (buck).

In response to EC 115 identifying a load that requires a ~10 V bus 208, EC 115 may couple the load to the power bus provided by the 4s output terminal while selecting a value of m equal to 1 (or it may select $V_{BATT}$ from bypass circuit 205), or it may switch the load to receive the power bus from the 2s output terminal while selecting a value of m 207 equal to 2 for buck-boost converter 203 (boost).

In response to EC 115 identifying a load (e.g., high-voltage subsystem 211) that requires a ~20 V bus 208, EC 115 may couple the load to the power bus from the 2s output terminal while selecting a value of m equal to 4 for buck-boost converter 203 (boost), or it may switch the load to receive the power bus from the 4s output terminal while selecting a value of m 207 equal to 2 (a smaller boost).

In response to EC 115 identifying a load (e.g., low-voltage subsystem 211) that requires a ~2.5 V rail 208, EC 115 may couple the load to the power bus from the 2s output terminal while selecting a value of m equal to 0.5 for buck-boost converter 203 (buck), or it may switch the load to receive the power bus from the 4s output terminal while selecting a value of m 207 equal to 0.25 (a larger buck).

In various implementations, BMU 202 may be configured to select a charge or discharge rate that extends the life of battery 201 and/or increases its performance based upon the various metrics discussed above. In some cases, BMU 202 may select cells 520A-C of block 521 to provide $V_{BATT}$ in response to a determination that cells 520A-C provide the selected charge rate and/or discharge rate. In other cases, BMU 202 may select cells 522A-C of block 523 to provide $V_{BATT}$ in response to a determination that cells 522A-C provide the selected charge rate and/or discharge rate. In yet other cases, BMU 202 may select both cells 521A-C and 522A-C of blocks 521 and 523 to provide $V_{BATT}$. Moreover, BMU 202 may be configured to select different subsets of one or more cells from different blocks to provide $V_{BATT}$, and it may programmatically route or wire the battery's terminals to result in a number of different serial and/or parallel cell configurations.

As such, EC 115 may adjust the value of m according to a configuration operation performed by BMC 202. For example, if BMC 202 selects $V_{BATT}$ to be provided by cells 520A-C in series (3s), m may be equal to "X". If BMC 202 selects $V_{BATT}$ to be provided by cells 520A-C in series (3s) along with cells 522A-C, also in series (3s), resulting in a 6s configuration, then EC 115 may select m equal to "X/2".

In some cases, values of m may be selected for an initial configuration at manufacturing and/or it may be dynamically re-configurable during operation of IHS 100. As a person of ordinary skill in the art will recognize in light of this disclosure, battery 201 may be replaced by other types of batteries and/or BMU 202 may be replaced by other types of BMUs without any changes to the overall architecture of power system 200.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
an embedded controller (EC) coupled to the processor, wherein the EC comprises a microcontroller that handles tasks that an Operating System (OS) executed by the processor does not handle; and
a memory coupled to the EC, the memory having program instructions stored thereon that, upon execution by the EC, cause the EC to:
determine a characteristic of a battery coupled to the IHS;
determine a characteristic of a load within the IHS, wherein the characteristic of the load comprises: (a) a turbo state or a non-turbo state, or (b) a high-dynamic range (HDR) state or a non-HDR state; and
dynamically select a scalar multiplier value of a buck-boost converter coupled to an output of the battery in response to changes to the characteristic of the battery and to changes to the characteristic of the load, wherein the output of the buck-boost converter is set to a nominal voltage multiplied by the scalar multiplier value, wherein being multiplied by the scalar multiplier value comprises switching on or off one or more energy storage elements in series within the buck-boost converter.

2. The IHS of claim 1, wherein to determine the characteristic of the battery, the program instructions, upon execution by the EC, cause the EC to identify the battery or a component of the battery.

3. The IHS of claim 2, wherein to identify the battery, the program instructions, upon execution by the EC, cause the EC to retrieve a serial number of the battery or a serial number of the component of the battery.

4. The IHS of claim 1, wherein to determine the characteristic of the battery, the program instructions, upon execution by the EC, cause the EC to retrieve a power resource specification of the battery from an Advanced Configuration and Power Interface (ACPI) table.

5. The IHS of claim 1, wherein to determine the characteristic of the battery, the program instructions, upon execution by the EC, cause the EC to perform an electrical characterization of the battery.

6. The IHS of claim 1, wherein the program instructions, upon execution by the EC, further cause the EC to:
select a first scalar multiplier value in response to a battery management unit (BMU) selecting a first battery output terminal, wherein the BMU comprises a controller and a memory coupled to the controller; and
select a second scalar multiplier value in response to the BMU selecting a second battery output terminal.

7. The IHS of claim 1, wherein the program instructions, upon execution by the EC, further cause the EC to:
select a first scalar multiplier value for a first number of cells arranged in series within the battery; and
select a second scalar multiplier value for a second number of cells arranged in series within the battery, wherein the number of cells changes dynamically during operation of the IHS.

8. The IHS of claim 7, wherein the first scalar multiplier value is larger than the second scalar multiplier value in response to the first number of cells being smaller than the second number of cells.

* * * * *